United States Patent [19]
Rudi

[11] Patent Number: 4,984,111
[45] Date of Patent: Jan. 8, 1991

[54] MAGNETIC TAPE RECORDER WITH CAPSTAN CASSETTE TRANSPORT

[75] Inventor: Guttorm Rudi, Fjellhamar, Norway
[73] Assignee: Tandberg Data AS, Oslo, Norway
[21] Appl. No.: 266,404
[22] Filed: Nov. 2, 1988

[30] Foreign Application Priority Data
Nov. 3, 1987 [DE] Fed. Rep. of Germany ....... 3737286

[51] Int. Cl.$^5$ .............................................. G11B 5/008
[52] U.S. Cl. ..................... 360/96.5; 360/71; 360/93
[58] Field of Search .................. 360/96.5, 92, 93, 71, 360/96.3, 96.1

[56] References Cited

U.S. PATENT DOCUMENTS

| | | | |
|---|---|---|---|
| 3,816,851 | 6/1974 | White et al. | 360/92 |
| 4,308,562 | 12/1981 | Negishi | 360/71 |
| 4,379,313 | 4/1983 | Tsuchiva | 360/96.5 |
| 4,434,444 | 2/1984 | Sato | 360/71 X |
| 4,561,031 | 12/1985 | Tanabe | 360/96.5 |
| 4,573,091 | 2/1986 | Barton, Jr. | 360/93 |
| 4,622,606 | 11/1986 | Rudi | 360/96.5 |
| 4,622,610 | 11/1986 | Makigawa | 360/92 |
| 4,636,890 | 1/1987 | Rudi et al. | 360/96.5 |

FOREIGN PATENT DOCUMENTS
0109154 5/1984 European Pat. Off. .
8101796 11/1982 Netherlands .
2024493 1/1980 United Kingdom .

Primary Examiner—John H. Wolff
Attorney, Agent, or Firm—Hill, Van Santen, Steadman & Simpson

[57] ABSTRACT

In known magnetic tape recorder devices for cassettes provided with a magnetic tape, the cassette is manually inserted into its final position. The ejection of the cassette ensues upon employment of a lever mechanism or of a spring that is tensed upon insertion of the cassette. In the magnetic tape recorder device of the invention, the cassette is only partially inserted or, respectively, ejected and the further, at least partial draw-in and ejection ensues upon employment of a motor-driven drive capstan that moves the magnetic tape in the cassette in the normal operating condition. The automatic draw-in and ejection of the cassette is possible in the magnetic tape recorder device wherein the drive capstan is laterally arranged.

10 Claims, 2 Drawing Sheets

MAGNETIC TAPE RECORDER WITH CAPSTAN CASSETTE TRANSPORT

BACKGROUND OF THE INVENTION

The invention is directed to a magnetic tape recorder means having a cassette that contains a magnetic tape, the cassette being inserted into the magnetic tape recorder means in longitudinal direction and containing a conveyor or roller for moving the magnetic tape in a recess of a longitudinal wall, and comprising a motor driven drive capstan that, when the cassette is completely introduced, contacts a conveyor roller in the operating position in order to move the magnetic tape.

U.S. Pat. Nos. 4,636,890 and 4,622,606 disclose magnetic tape recorder means into which a cassette containing a magnetic tape is inserted in longitudinal direction. In a recess at a longitudinal wall, the cassette contains a conveyor roller with which the magnetic tape is driven between two reels contained in the cassette. At its front side, the magnetic tape recorder means comprises a cover that is opened before the cassette is pushed in. The cassette is manually inserted until its backwall strikes against a spring or against a lever that forms a preliminary detent. The cassette is pushed into a final operating position with the closing of the cover. At the same time, a dust cover at the cassette is opened and a magnetic head is pivoted in behind this dust cover. Further, a drive capstan that is driven by a motor comes into contact with the conveyor roller, so that the magnetic tape can be subsequently moved in both of its longitudinal directions upon employment of the motor. When the cassette is to be removed, the cover is opened again and, simultaneously with the opening, the cassette is ejected by a given distance from the magnetic tape recorder means under the force of a spring or via a lever mechanism that is connected to the cover. At the same time, the magnetic head is pivoted away from the magnetic tape and the dust cover of the cassette is closed again. During ejection, the drive capstan rolls off on a longitudinal wall of the cassette.

In these magnetic tape recorder means, the cassette must be manually inserted relatively far in order to be able to close the cover and, in a corresponding fashion, it is only ejected from the magnetic tape recorder means by a relatively short distance so that the manual grasping of the cassette is not always that easy.

SUMMARY OF THE INVENTION

It is therefore an object of the invention to provide a magnetic tape recorder means wherein the insertion and the ejection of the cassette are greatly simplified, so that ease of operation is achieved.

In a magnetic tape recorder means as initially described above, this object is inventively achieved wherein following a partial, manual insertion of said cassette into the magnetic tape recorder means, the motor automatically draws the cassette into the magnetic tape recorder means upon employment of the drive capstan and/or in that following a manual, partial ejection of the cassette, the motor ejects the cassette a prescribed distance out of the magnetic tape recorder means upon employment of the drive capstan.

The magnetic tape recorder means of the invention has the advantage that no significant, additional outlay is required in order to largely automatically introduce the cassette into the magnetic tape recorder means or, respectively, to eject it therefrom. Many essential elements are already contained in the magnetic tape recorder means, so that only a processing unit must be fashioned such that it executes the appropriate events. The processing unit is expediently fashioned as a microcomputer.

The cassette is drawn in upon employment of the motor and of the drive capstan only up to a preliminary final position and it is ejected up to a prescribed position in the same fashion.

The draw-in and the ejection of the cassette ensue given a disconnected motor when, due to the roll-off of the drive capstan on the sidewall, signals have been generated at a tachometer generator that is connected to the motor and these signals have been recognized by a processing unit and the motor is then turned on. It is also possible to turn the motor on or off when a light barrier recognizes corresponding positions of the cassette. It is also possible to respectively shut the motor off when the tachometer generator connected to the motor has output a corresponding plurality of signals or when a timer emits a signal allocated to an on-time of the motor.

If the magnetic tape recorder means is provided with a door that covers an insertion channel for the cassette and the cassette is brought into a final operating position when said door is closed, it is advantageous when the cassette is drawn into a magnetic tape recorder means with the capstan roller driven by the motor to such an extent that it is possible to close the door. In a corresponding fashion, it is also beneficial to eject the cassette from the magnetic tape recorder means to such an extent with the capstan roller driven by the motor that it can be comfortably grasped by an operator and removed.

In order to avoid additional wear and a potential contamination of the capstan roller in that region in which it contacts the conveyor roller in the cassette, it is advantageous when the capstan roller contacts the sidewall of the cassette in a region that differs from the region that contacts the conveyor roller. This can ensue in that the capstan roller comprises a greater circumference in a region wherein it does not contact the conveyor roller. The enlargement of the circumference can be made in steps or continuously.

BRIEF DESCRIPTION OF THE DRAWINGS

An exemplary embodiment of the magnetic tape recorder means shall be set forth in greater detail below with reference to the drawings. Shown therein are.

DESCRIPTION OF THE PREFERRED EMBODIMENTS

Figure 1:
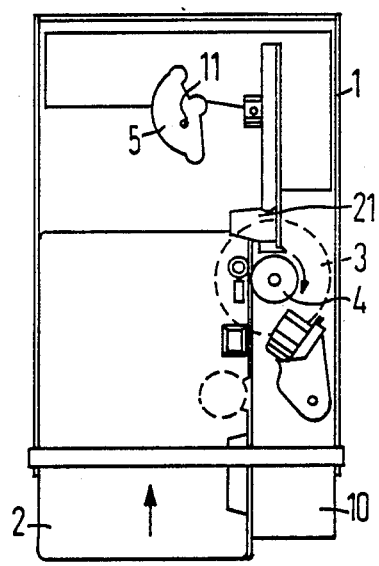
FIG. 1 is a plan view of a magnetic tape recorder means embodying the principles of the present invention including a partially introduced cassette.

The magnetic tape recorder means 1 shown in FIG. 1 largely corresponds to the magnetic tape recorder means disclosed in U.S. Pat. No. 4,636,890. It comprises an insertion channel for a cassette 2 that is inserted into the magnetic tape recorder means to such an extent that a capstan roller 4 driven by a motor 3 is sure to contact a sidewall of the cassette 2. The adjacent capstan 4 is turned due to the further manual insertion of the cassette 2 into the insertion channel. This turning is acquired or detected by a tachometer generator connected to the motor 3 that, for example, is fashioned as a coding disk having an appertaining detector. In response thereto, a control unit effects a turn-on of the motor 3 in the rotational sense indicated by the arrow and, upon employment of the motor 3 and of the drive capstan 4, the cassette 2 is thus drawn into the magnetic tape recorder means until it strikes against a swivel arm 5. The motor 3 is then turned off.

Figure 2:
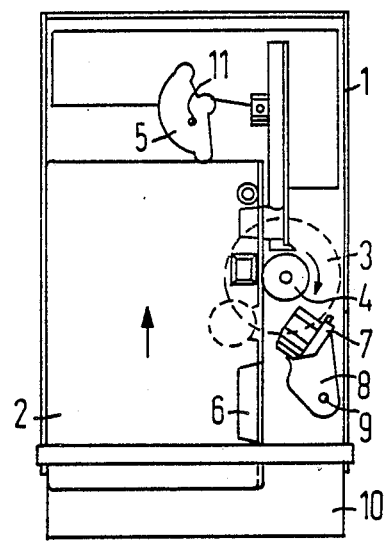
FIG. 2 is a plan view of the magnetic tape recorder means including the cassette drawn in up to a preliminary final position.

FIG. 2 shows the condition wherein the cassette 2 has been drawn into the magnetic tape recorder means up to the swivel arm 5 upon employment of the motor 3 and of the drive capstan 4.

The cassette 2 contains a dust cover 6 that covers a region of a magnetic tape contained in the cassette 2, a magnetic head 7 having to come into contact with this region in the operating condition. In the condition shown in FIG. 2, the magnetic head 7 is pivoted away from the cassette 2. The magnetic head 7 is secured on a magnetic head carrier 8 that is pivotable around a pivot point 9.

Figure 3:
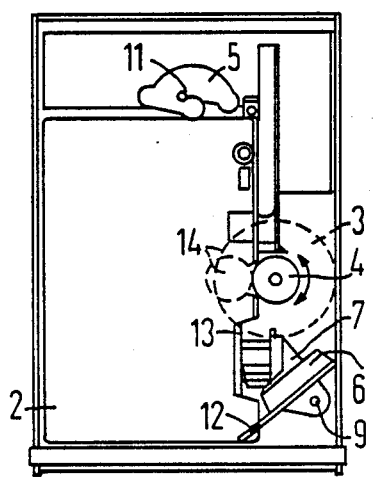
FIG. 3 is a plan view of the magnetic tape recorder means with the cassette situated in its final operating position.

The magnetic tape recorder means comprises a cover 10 that is hinged opened to expose the insertion channel for insertion of the cassette 2, as shown in FIGS. 1 and 2. When the cover 10 is closed, joining pieces at the cover 10 press against the cassette 2 and push the latter into the final operating position shown in FIG. 3. The swivel arm 5 is thereby swivelled around a pivot point 11 due to the closing of the cover 10. Simultaneously, a swivel arrangement (not shown) that is connected to the cover 10 presses on the back end of the dust cover 6 that is seated pivotable around a pivot point 12, so that the dust cover 6 opens. When the dust cover 6 is at least partially opened, the magnetic head 7 is swivelled around the pivot point 9 in behind the dust cover 6 and comes into contact with the magnetic tape 13.

During operation of the magnetic tape recorder means, the motor 3 is driven in accord with the desired feed direction of the magnetic tape and a conveyor roller 14 that moves the magnetic tape 13 is driven in the cassette 2 via the drive capstan 4.

Figure 4:
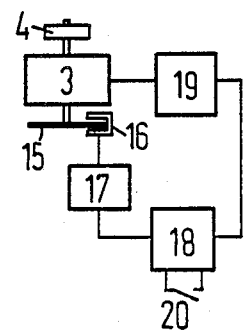
FIG. 4 is a block circuit diagram of a control unit of the magnetic tape recorder means.

Given the schematic illustration shown in FIG. 4, the drive capstan 4, first, and a tachometer generator, second, are arranged at the motor 3, this tachometer generator in the illustrated exemplary embodiment being formed of the optical coding disk 15 and a detector that is formed of an optoelectronic scanner 16 and of an evaluation unit 17. The evaluation unit 17 is connected to a control unit 18 that, first, emits control signals to a motor controller 19 in a known fashion during normal operation of the magnetic tape recorder means in order to drive the motor 3 in accord with the desired moving direction of the magnetic tape 13. In the magnetic tape recorder means of the invention, the control unit 18 also serves the purpose of outputting appropriate signals to the motor controller 19 in order to effect that the motor 3 automatically draws the cassette 2 into the magnetic tape recorder means with the drive capstan 4 when the evaluation unit 17 determines that, as shown in FIG. 1, the drive capstan 4 was turned due to the manual insertion of the cassette 2. An opened switch 20 here is intended to schematically indicate that the normal functions of the control unit 18 for the motion of the magnetic tape 13 are shut off for the automatic draw-in of the cassette 2. Functions corresponding to those during the automatic draw-in of the cassette 2 can also be executed during the automatic ejection of the cassette 2. The control unit 18 is expediently fashioned as a microcomputer.

Figure 5:
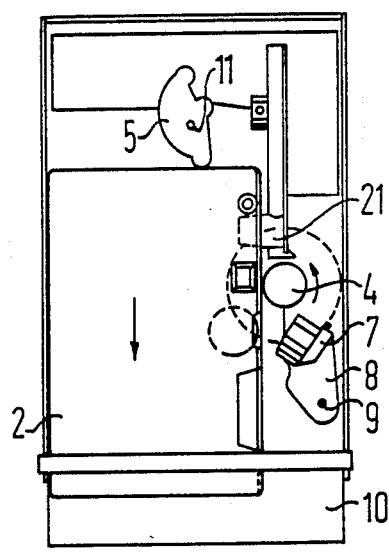
FIG. 5 is a plan view of the magnetic tape recorder means with the cassette situated in a second stop position.

When, as shown in FIG. 5, the cover 10 is opened with the magnetic tape recorder means shut off, the cassette 2 is thrust a prescribed distance out of the magnetic tape recorder means by the swivel arm 5 that is connected to the cover 10. Simultaneously, the magnetic head 7 is pivoted away from the cassette 2 around the pivot point 9 and the dust cover 6 is closed again.

Due to the ejection, the drive capstan 4 that presses against the sidewall of the cassette 2 is turned in the direction of the arrow and this turning is identified by the tachometer generator and is recognized in the evaluation unit 18. Following thereupon, the control unit 18 forwards signals to the motor Controller 19 that effect a rotation of the motor and the cassette 2 is ejected a prescribed distance out of the magnetic tape recorder means by the drive capstan 4. This ejection, for example, can ensue up to the position in which the drive capstan 4 no longer contacts the sidewall of the cassette 2, as shown in FIG. 5. The position up to which the cassette 2 is ejected can also be perceived by a light barrier. For example, a light barrier 21 that is provided in the magnetic tape recorder means for other purposes can be co-employed for this purpose when a further photo-receiver is attached at the insertion channel.

The distance by which the cassette 2 is moved both during insertion as well as during ejection can be defined upon employment of a timer in the control unit 17, this timer indicating how long the motor 3 is respectively turned on, or can also ensue upon employment of a counter that counts the pulses output by the coding disk, turning the motor 3 off again when a prescribed plurality of pulses has been reached.

Figure 6:
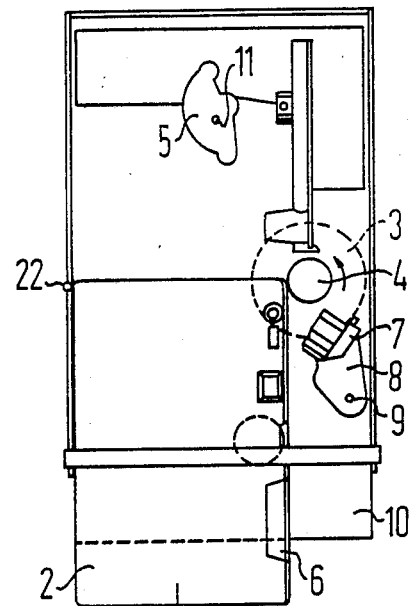
FIG. 6 is a plan view of the magnetic tape recorder means with partially ejected cassette.

For guiding a cassette 2 in the insertion channel, a further roller 22 (FIG. 6) can, for example, be provided lying opposite the drive capstan 4 and additional rollers can be attached at further locations of the insertion channel as needed.

Figure 7:
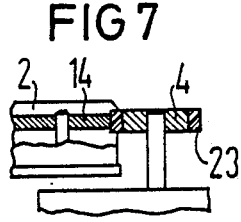
FIG. 7 is a partial section through a drive capstan when this contacts a conveyor roller of the cassette.
Figure 8:
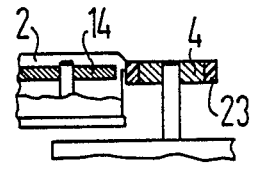
FIG. 8 is a partial section through the capstan roller when this contacts the cassette.

Given the partial section through the drive capstan 4 and through the conveyor roller 14 in the cassette 2 that is shown in FIG. 7, one can see that the drive capstan 4 comprises an elastic layer 23 that contacts the conveyor roller 14 in the normal operating condition and drives the latter for the movement of the magnetic tape. The illustration in FIG. 8 shows that position wherein the drive capstan 4 contacts the sidewall of the cassette 2 with its elastic layer 23 in order to automatically draw the cassette in or, respectively, eject it. The drive capstan 4 thereby contacts the cassette 2 in only a small region, so that wear and contamination of the elastic layer 23 are largely avoided.

Figure 9:
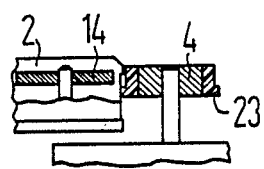
FIG. 9 is a partial section through another embodiment of the drive capstan.
Figure 10:
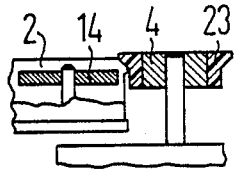
FIG. 10 is a further embodiment of the drive capstan.

FIGS. 9 and 10 show further embodiments of the driven capstan 4. In the illustration of FIG. 9, the elastic layer 23 is fashioned such that the drive capstan 4 comprises a larger circumference in its lower region. The result thereof is that only this region contacts the sidewall of the cassette 2 during the automatic draw-in and ejection of the cassette 2, so that the remaining region that contacts the conveyor roller 14 in the operating condition is not additionally worn or contaminated.

An additional wear or contamination of the region that contacts the conveyor roller 14 is also avoided given the embodiment of the drive capstan 4 shown in FIG. 10 in that the elastic layer 23 comprises a larger circumference in the upper region and contacts the sidewall of the cassette only in this upper region. Since a commercially available cassette that is employed for this purpose is usually slanted at the upper edge of the sidewall, the corresponding region of the elastic layer is also slanted or, respectively, conically fashioned.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A magnetic tape recorder means adapted to receive a generally rectangular cassette lengthwise in a longitudinal direction, said cassette containing a magnetic tape and a conveyor roller rotatably mounted adjacent to a recess of a longitudinal sidewall of said cassette and designed for moving said magnetic tape within said cassette, said tape recorder means comprising a locking mechanism for moving said cassette, as it is being inserted into the tape recorder means, from an intermediate rest position into a defined operating rest position and securing the same therein, said tape recorder means further comprising a capstan driven by a motor and engaging said conveyor roller upon locking of said cassette in said operating rest position, said motor, in addition, being operative to perform at least one of two steps of automatically moving said cassette into said intermediate rest position, upon employment of said capstan, following a partial manual insertion of said cassette into said tape recorder means, and ejecting said cassette a prescribed distance out of said intermediate rest position, upon employment of said capstan, following a partial ejection of said cassette out of said operating rest position into said intermediate rest position, upon manual release of said locking mechanism.

2. The magnetic tape recorder means of claim 1, whereby said motor automatically moves said cassette to said intermediate rest position.

3. The magnetic tape recorder means of claim 1, whereby said motor automatically ejects said cassette to a position in which said cassette can be comfortably manually grasped.

4. The magnetic tape recorder means of claim 1, including means for turning on said motor upon insertion or ejection of said cassette as soon as said drive capstan rolls on a sidewall of said cassette.

5. The magnetic tape recorder means of claim 4, wherein said means for turning on said motor comprises a light barrier mounted in said magnetic tape recorder means which identifies corresponding positions of said cassette to turn said motor on and off.

6. The magnetic tape recorder means of claim 4, wherein said means for turning on said motor comprises a tachometer generator that is connected to said motor which is operative to shut off said motor when said tachometer generator has identified a prescribed plurality of signals.

7. The magnetic tape recorder means of claim 4, including a timer which is operative to shut off said motor when a prescribed time duration has elapsed after the turn-on of said motor.

8. The magnetic tape recorder means of claim 1, wherein said locking mechanism includes a hinged cover for covering an opening for receiving said cassette, said cover being operative to move said cassette into said operating rest position from said intermediate rest position when said cover is closed, wherein said cassette is brought into said intermediate rest position with said motor and with said drive capstan which enables a closing of said cover.

9. The magnetic tape recorder means of claim 1, wherein said drive capstan is fashioned such that it contacts said sidewall of said cassette with a first region that is at least partly different from a second region with which is contacts said conveyor roller in said cassette.

10. The magnetic tape recorder means of claim 9, wherein said first region of said drive capstan has a larger diameter than said second region.

* * * * *